US011115987B2

(12) United States Patent
Huang et al.

(10) Patent No.: US 11,115,987 B2
(45) Date of Patent: Sep. 7, 2021

(54) METHOD AND APPARATUS FOR CONTROLLING NETWORK DEVICES PROVIDING NETWORK SERVICES FOR A PLURALITY OF OVER-THE-AIR AREAS

(71) Applicant: CLOUDMINDS (SHANGHAI) ROBOTICS CO., LTD., Shanghai (CN)

(72) Inventors: William Xiao-Qing Huang, Shenzhen (CN); Zhenkai Wang, Shenzhen (CN); Haitao Jiang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 14 days.

(21) Appl. No.: 16/551,805

(22) Filed: Aug. 27, 2019

(65) Prior Publication Data
US 2020/0015237 A1   Jan. 9, 2020

Related U.S. Application Data

(63) Continuation of application No. PCT/CN2017/103760, filed on Sep. 27, 2017.

(51) Int. Cl.
*H04W 72/04* (2009.01)
*H04W 72/08* (2009.01)
(Continued)

(52) U.S. Cl.
CPC ......... *H04W 72/082* (2013.01); *B64C 39/024* (2013.01); *G05D 1/0022* (2013.01);
(Continued)

(58) Field of Classification Search
CPC ..... H04W 72/082; H04W 4/029; H04W 4/08; H04W 4/021; H04W 36/20; H04W 16/10;
(Continued)

(56) References Cited

U.S. PATENT DOCUMENTS

| 6,657,982 B1 * | 12/2003 | Fong .................... H04W 16/06 |
| | | 370/336 |
| 2002/0122406 A1 * | 9/2002 | Chillariga .............. H04B 1/715 |
| | | 370/347 |

(Continued)

FOREIGN PATENT DOCUMENTS

| CN | 101772032 A | 7/2010 |
| CN | 102546700 A | 7/2012 |

(Continued)

OTHER PUBLICATIONS

Extended European Search Report for the counterpart of EP Application No. 17927831.2, dated Mar. 12, 2020, 10 pages total.

(Continued)

*Primary Examiner* — Hashim S Bhatti
*Assistant Examiner* — Mahbubul Bar Chowdhury
(74) *Attorney, Agent, or Firm* — USCH Law, PC

(57) ABSTRACT

The present disclosure provides a method and an apparatus for controlling a network device, a method and an apparatus for sending control information, and a method and an apparatus for data. According to technical solutions provided in the present disclosure, network devices providing network services for different over-the-air areas are scheduled to different time grids, so that the terminal devices located in different over-the-air areas send data to respective corresponding network devices within different time grids, thereby avoiding signal interference and improving network quality.

10 Claims, 4 Drawing Sheets

(51) Int. Cl.
*H04W 4/029* (2018.01)
*B64C 39/02* (2006.01)
*G05D 1/00* (2006.01)
*H04L 12/717* (2013.01)
*H04L 29/08* (2006.01)
*H04W 36/20* (2009.01)

(52) U.S. Cl.
CPC .............. *H04L 45/42* (2013.01); *H04L 67/12* (2013.01); *H04W 4/029* (2018.02); *H04W 36/20* (2013.01)

(58) Field of Classification Search
CPC ............ B64C 39/024; B64C 2201/122; G05D 1/0022; H04L 45/42; H04L 67/12; H04L 67/18; H04L 67/16; H04L 67/32; H04L 67/322; H04L 5/0053; H04L 5/0048; H04B 7/26
See application file for complete search history.

(56) References Cited

U.S. PATENT DOCUMENTS

| | | | |
|---|---|---|---|
| 2010/0014362 A1 | 1/2010 | Murata et al. | |
| 2010/0085884 A1* | 4/2010 | Srinivasan | H04W 52/343 370/252 |
| 2010/0254344 A1* | 10/2010 | Wei | H04W 16/10 370/330 |
| 2010/0309876 A1 | 12/2010 | Khandekar et al. | |
| 2012/0225661 A1* | 9/2012 | Kazmi | H04W 16/04 455/447 |
| 2014/0099942 A1 | 4/2014 | Kim et al. | |
| 2014/0128074 A1 | 5/2014 | Vangala et al. | |
| 2015/0092627 A1 | 4/2015 | Liu et al. | |
| 2016/0150427 A1* | 5/2016 | Ramanath | H04W 24/06 370/252 |
| 2016/0205560 A1* | 7/2016 | Hyslop | H04B 7/18506 455/454 |
| 2017/0171761 A1* | 6/2017 | Guvenc | H04W 36/32 |
| 2017/0238324 A1 | 8/2017 | Lin et al. | |
| 2017/0251389 A1 | 8/2017 | Hong et al. | |
| 2018/0332522 A1* | 11/2018 | Axmon | H04W 72/0406 |
| 2020/0264636 A1 | 8/2020 | Zhang | G08G 5/0039 |

FOREIGN PATENT DOCUMENTS

| | | |
|---|---|---|
| CN | 103281706 A | 9/2013 |
| CN | 104469688 A | 3/2015 |
| CN | 106255160 A | 12/2016 |
| CN | 107078819 A | 8/2017 |
| EP | 1492369 A1 | 12/2004 |
| JP | 2010-537542 A | 12/2010 |
| JP | 2015-089133 A | 5/2015 |
| WO | 2014/012192 A1 | 1/2014 |
| WO | WO 2014/181378 A1 | 11/2014 |
| WO | WO 2016/115061 A1 | 7/2016 |

OTHER PUBLICATIONS

Cloudminds (Shenzhen) Robotics Systems Co., Ltd., CN 201780002000.7, First Office Action (CN), dated Apr. 14, 2020, 9 pgs.

Cloudminds (Shenzhen) Robotics Systems Co., Ltd., CN 201780002000.7, Final Office Action (CN), dated Dec. 4, 2020, 4 pgs.

Nokia, Nokia Shanghai Bell, "Interference Detection for Aerial Vehicles," Document for Discussion and Decision, 3GPP TSG RAN WG2 Meeting #99, Aug. 25, 2017, 7 pgs.

Cloudminds (Shenzhen) Robotics Systems Co., Ltd., JP 2019-552558, First Office Action (JP), dated Jan. 26, 2021, 6 pgs.

* cited by examiner

METHOD AND APPARATUS FOR CONTROLLING NETWORK DEVICES PROVIDING NETWORK SERVICES FOR A PLURALITY OF OVER-THE-AIR AREAS

CROSS REFERENCE TO RELATED APPLICATIONS

The present disclosure is a continuation of international application No. PCT/CN2017/103760, filed on Sep. 27, 2017, and titled "METHODS AND APPARATUS FOR CONTROLLING NETWORK DEVICE AND SENDING CONTROL INFORMATION OR DATA", which is incorporated herein by reference in its entirety.

TECHNICAL FIELD

The present disclosure relates to communication technologies, and in particular, to a method and an apparatus for controlling a network device, a method and an apparatus for sending control information, and a method and an apparatus for sending data.

BACKGROUND

At present, production of personal and commercial unmanned aerial vehicles (UAV) is growing rapidly. The UAV is applied to people's daily life, and in addition, the UAV is further widely applied to fields such as film, media, agriculture, oil and gas monitoring. With a continuous expansion of the application field, the UAV has an increasingly high demand for communication. A network operator, a UAV manufacturer, and a supervision department are actively negotiating to pre-install a subscriber identity module (SIM) card for the UAV when being delivered, and to execute a real-name registration for starting up the UAV to achieve integration between supervision and communication. Therefore, future network-connected UAV communication based on 4G and 5G technologies will be a hot technology.

At present, a flight altitude of the UAV is up to 300 meters, and a maximum horizontal speed is up to 160 km/h. However, base stations in an existing LTE system all have a down-tilt angle and serve the ground instead of facing to the sky and serving an over-the-air service. Moreover, a propagation model between a terminal on the ground and a base station differs greatly from a propagation model between the base station and the flying UAV. Therefore, using the existing LTE system to serve the UAV will cause a lot of problems.

In the existing LTE system, a same base station provides the network service not only for the terminal on the ground but also for the UAV flying in the air. At a same moment, one base station provides a network service for the terminal on the ground or the UAV flying in the air, which may cause interference to that another base station provides the network service for other terminals on the ground or UAVs flying in the air. Similarly, at the same moment, the terminal on the ground or the UAV flying in the air sends data to a base station, which may cause interference to that other terminals on the ground or UAVs flying in the air send data to another base station.

SUMMARY

A main objective of the present disclosure is to provide a method and an apparatus for controlling a network device, a method and an apparatus for sending control information, and a method and an apparatus for sending data, to resolve an existing problem of signal interference in the related technologies.

In order to achieve the objective above, a first aspect of the present disclosure provides a method for controlling a network device applied to a control device. The method includes:

determining a set of network devices that corresponds to each over-the-air area and that provides a network service for the over-the-air area; and sending control information to each network device, where the control information is configured to instruct, within each time grid, a network device in the set of network devices corresponding to the each time grid to operate and a network device not in the set of network devices corresponding to the each time grid to stop operating.

A second aspect of the present disclosure provides a method for sending control information applied to a network device. The method includes:

receiving control information sent by a control device, where the control information is configured to instruct the network device to operate or stop operating within each time grid;

performing an operation corresponding to the control information, and sending the control information to a terminal device.

A third aspect of the present disclosure provides a method for sending data applied to a terminal device. The method includes:

receiving control information sent by a network device, where the control information is configured to instruct the network device to operate or stop operating within each time grid; and sending, within the each time grid, data to the network device that provides a network service for an over-the-air area in which the terminal device is located according to the control information.

A fourth aspect of the present disclosure provides an apparatus for controlling a network device applied to a control device. The apparatus includes:

a determining module which is configured to determine a set of network devices that corresponds to each over-the-air area and that provides a network service for the over-the-air area;

a sending module which is configured to send control information to each network device where the control information is configured to instruct, within each time grid, a network device in the set of network devices corresponding to the each time grid to operate, and instruct a network device not in the set of network devices corresponding to the each time grid to stop operating.

A fifth aspect of the present disclosure provides an apparatus for sending control information applied to a network device. The apparatus includes:

a receiving module which is configured to receive control information sent by a control device, where the control information is configured to instruct the network device to operate or stop operating within each time grid; and a processing module which is configured to perform an operation corresponding to the control information, and send the control information to a terminal device.

A sixth aspect of the present disclosure provides an apparatus for sending data applied to a terminal device. The apparatus includes:

a receiving module which is configured to receive control information sent by a network device, where the control information is configured to instruct the network device to operate or stop operating within each time grid; and a sending module which is configured to send, within the each time grid, data to a terminal device that provides a network service for an over-the-air area in which the terminal device is located according to the control information.

A seventh aspect of the present disclosure provides a non-transitory computer readable storage medium which includes one or more programs for performing the method in the first aspect of the present disclosure.

An eighth aspect of the present disclosure provides an apparatus for controlling a network device. The apparatus includes: the non-transitory computer readable storage medium in the seventh aspect of the present disclosure; and one or more processors for executing a program in the non-transitory computer readable storage medium.

A ninth aspect of the present disclosure provides a control device which includes the apparatus for controlling the network device in the fourth aspect of the present disclosure, where the control device is a network management system device or a primary serving base station.

A tenth aspect of the present disclosure provides a non-transitory computer readable storage medium including one or more programs for performing the method in the second aspect of the present disclosure.

An eleventh aspect of the present disclosure provides an apparatus for sending control information. The apparatus includes: the non-transitory computer readable storage medium in the ninth aspect of the present disclosure; and one or more processors for executing a program in the non-transitory computer readable storage medium.

A twelfth aspect of the present disclosure provides a network device which includes the apparatus for sending control information in the fifth aspect of the present disclosure, where the network device is a base station.

A thirteenth aspect of the present disclosure provides a non-transitory computer readable storage medium including one or more programs for performing the method in the third aspect of the present disclosure.

A fourteenth aspect of the present disclosure provides an apparatus for sending data. The apparatus includes: the non-transitory computer readable storage medium in the twelfth aspect of the present disclosure; and one or more processors for executing a program in the non-transitory computer readable storage medium.

A fifteenth aspect of the present disclosure provides a terminal device which includes the apparatus for sending data in the sixth aspect of the present disclosure, where the network device is a UAV or a mobile terminal.

According to technical solutions above, the network devices providing the network services for each over-the-air area are scheduled to each corresponding time grid, so that the terminal devices located in each over-the-air area send, within each corresponding time grid, data to the corresponding network devices, thereby avoiding signal interference and improving network quality.

BRIEF DESCRIPTION OF THE DRAWINGS

In order to describe technical solutions in embodiments of the present disclosure or in existing technologies more clearly, the following briefly describes accompanying drawings for describing the embodiments of the present invention. Obviously, the accompanying drawings in the following description show some embodiments of the present invention, and a person of ordinary skill in the art may still derive other drawings from these accompanying drawings without creative efforts.

DETAILED DESCRIPTION

Figure 1:
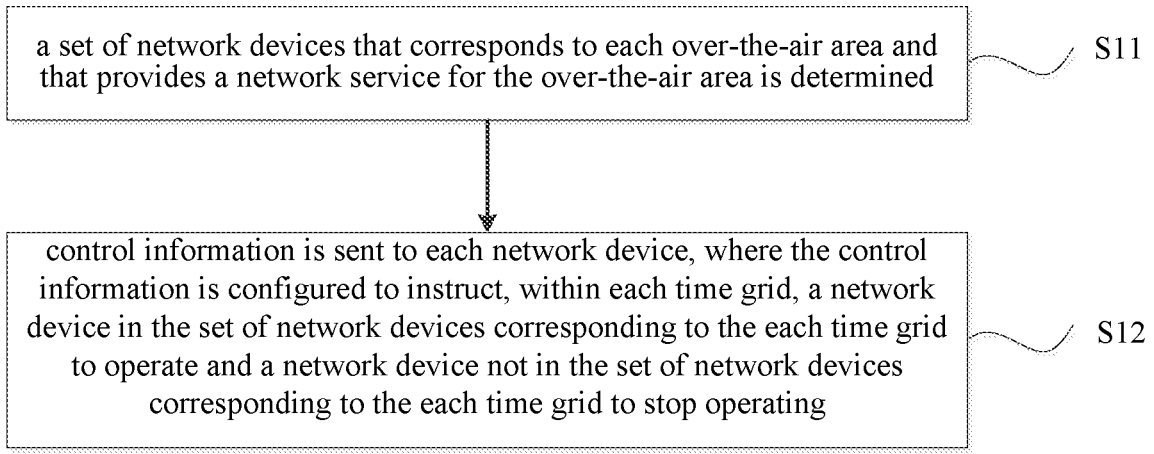
FIG. 1 is a flowchart of a method for controlling a network device according to an embodiment of the present disclosure.

In order to make objectives, technical solutions, and advantages of the present disclosure clearer, the following clearly and completely describes the technical solutions in embodiments of the present disclosure with reference to accompanying drawings in the embodiments of the present disclosure. Obviously, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions provided in the following embodiments of the present disclosure may be applied to a wireless communication network, for example: a long term evolution (LTE for short) system, a long term evolution advanced (LTE-A for short) system, and a further evolved network, such as a 5G network.

The wireless communication network may include a base station (BS for short) and a user equipment (UE for short). The base station may be a device in communication with the user equipment or other communication stations such as a relay station. The base station may provide communication coverage for a specific physical area. For example, the base station may be specifically an evolutional node B (ENB or eNodeB for short) in LTE, or may be other access network devices providing an access service in the wireless communication network.

In general, the wireless communication network may include a network management system for performing function configuration on the base station. For a distributed wireless communication system, the base station is classified into a primary serving base station and a secondary serving base station. The primary serving base station is configured to perform function configuration on the secondary serving base station, and the secondary serving base station is configured to report related information to the primary serving base station.

In an embodiment of the present disclosure, the UE may be a terminal device that flies in the air, such as a UAV. In an entire wireless network, the terminal device flying in the air may be distributed in each different over-the-air area. The over-the-air area is an altitude level region or an altitude value range.

During specific implementation, the over-the-air area may be preset according to a flight capability of the terminal device flying in the air. For example, a plurality of altitude levels and a range for each of the plurality of altitude levels are preset, a range for an altitude level which a location of the terminal device falls within is judged after location information of the terminal device flying in the air is obtained, and the altitude level of the terminal device may be determined. Alternatively, after location information of the terminal device flying in the air is obtained, the over-the-air area is divided according to a preset granularity. For example, the dividing granularity may be 10 meters, which indicates that a vertical altitude is divided into over-the-air areas by 10 meters.

An embodiment of the present disclosure provides a method for controlling a network device applied to a control device. The control device may be a network management system, and in this case, a controlled device (that is, the network device) is the base station. Alternatively, the control device may be the primary serving base station, and in this case, the controlled device is the secondary serving base station. Referring to FIG. 1, FIG. 1 is a flowchart of a method for controlling a network device according to an embodiment of the present disclosure. As shown in FIG. 1, the method includes the following steps.

Step S11: a set of network devices that corresponds to each over-the-air area and that provides a network service for the over-the-air area is determined.

Step S12: control information is sent to each network device, where the control information is configured to instruct, within each time grid, a network device in the set of network devices corresponding to the each time grid to operate and a network device not in the set of network devices corresponding to the each time grid to stop operating.

In an embodiment of the present disclosure, each over-the-air area corresponds to a set of network devices. A set of network devices which each over-the-air area corresponds to refer to a set of network devices that provides a network service for the over-the-air area.

Each set of network devices includes an identifier of the network devices providing the network service for a corresponding over-the-air area. Optionally, each set of network devices further includes an identifier of a beam sequence that is from each network device in the set of network devices and that provides the network service for the over-the-air area.

For example, a set of network devices corresponding to an over-the-air area 1 includes: a network device 1, a network device 2, and a network device 3. In other words, the network device 1, the network device 2, and the network device 3 all provide the network service for the over-the-air area 1. For another example, the set of network devices corresponding to the over-the-air area 1 includes: the network device 1 and a beam sequence 2, the network device 2 and a beam sequence 2, and the network device 3 and a beam sequence 1. In other words, the beam sequence 2 from the network device 1, the beam sequence 2 from the network device 2, and the beam sequence 1 from the network device 3 all provide the network service for the over-the-air area 1.

In an embodiment of the present disclosure, each network device in one set of network devices specifically provides a service for a corresponding over-the-air area, that is, each network device in one set of network devices is dedicated to the corresponding over-the-air area. Other over-the-air areas are provided with the network service by other sets of network devices. Therefore, for a network device, the network device provides a network service only for an over-the-air area corresponding to a set of network devices which the network device belongs to, not for other over-the-air areas corresponding to other set of network devices.

For example, a set of network devices corresponding to the over-the-air area 1 includes: the network device 1, the network device 2, and the network device 3. In other words, the network device 1, the network device 2, and the network device 3 are dedicated to the over-the-air area 1. Other over-the-air areas (e.g., an over-the-air area 2) are provided with a network service by other sets of network devices (e.g. a set of network devices 2). For the network device 1, the network device 1 provides a network service only for an over-the-air area corresponding to a set of network devices which the network device belongs to, not for other over-the-air areas corresponding to other set of network devices (e.g., the over-the-air area 2).

In an embodiment of the present disclosure, a time grid refers to a time period with a fixed length. Through time domain division, time is divided into a plurality of time grids, and each time grid corresponds to a set of network devices corresponding to an over-the-air area. In other words, within one time grid, each network device in a set of network devices that corresponds to an over-the-air area that corresponds to the time grid operates, and other network devices stop operating. In this way, the network devices that provide the network services for each over-the-air area are scheduled to each corresponding time grid, preventing a plurality of network devices from simultaneously providing the network services for the corresponding over-the-air areas to cause interference with each other, thereby improving network quality.

Figure 2:
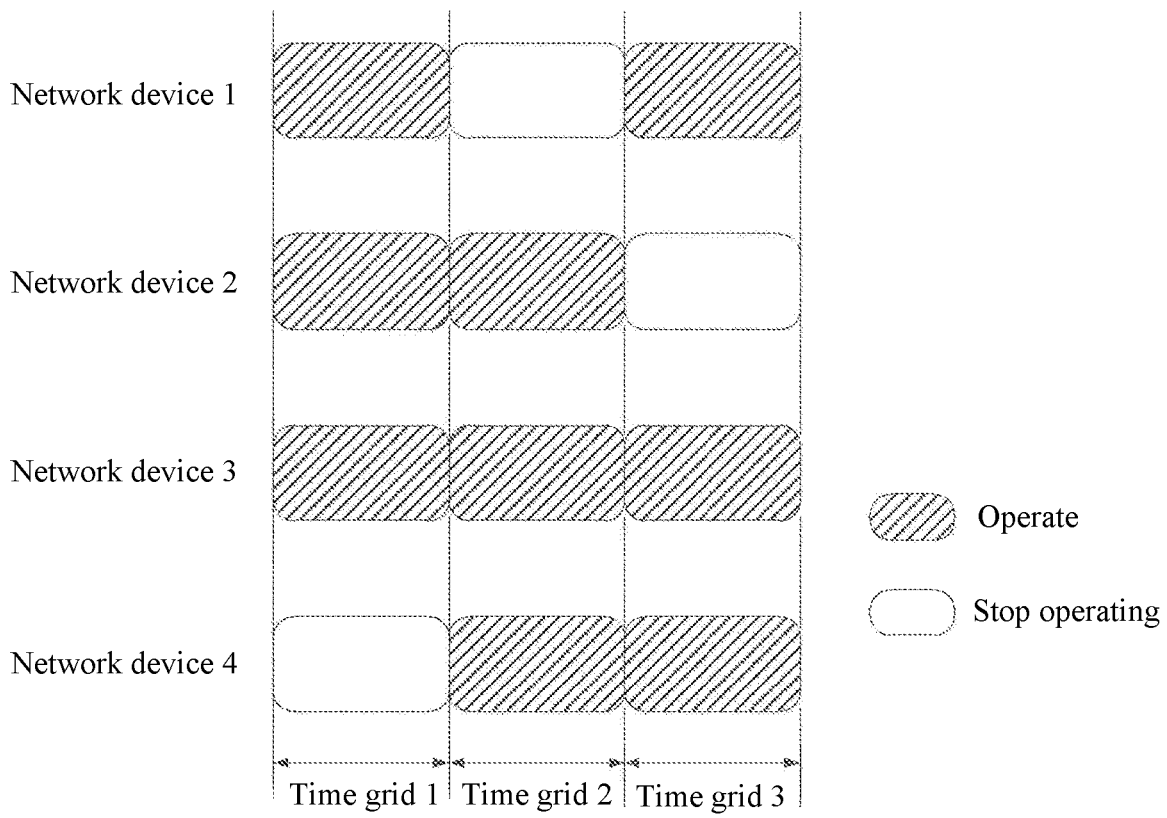
FIG. 2 is a schematic diagram of a correspondence between a time grid and a set of network devices according to an embodiment of the present disclosure.

For example, FIG. 2 is a schematic diagram of a correspondence between a time grid and a set of network devices according to an embodiment of the present disclosure. As shown in FIG. 2, a time grid 1 corresponds to a set of network devices 1 that provide a network service for an over-the-air area 1 and that include a network device 1, a network device 2, and a network device 3. Therefore, within a time grid 1, the network device 1, the network device 2, and the network device 3 all operate (a shadow area in FIG. 2 is used to indicate that the network device operates), so as to provide the network service for the over-the-air area 1. In this way, a terminal device located in the over-the-air area 1 may send data to the network device 1, the network device 2 and the network device 3 within the time grid 1. Moreover, within the time grid 1, a network device 4 stops operating (a blank area in FIG. 2 is used to indicate that the network device stops operating). Therefore, the network device 4 does not cause interference to the network device 1, the network device 2 and the network device 3, thereby improving network quality.

Optionally, a correspondence between a time grid and a set of network devices corresponding to an over-the-air area may be determined in the following manner.

Each time grid included in a control period is respectively allocated to a set of network devices corresponding to each over-the-air area according to the number of service requests and/or a service request delay of the terminal device located in each over-the-air area.

Optionally, the number of time grids in one control period allocated to the set of network devices corresponding to the over-the-air area is directly proportional to the number of service requests of the terminal device in the over-the-air area. Or, the number of time grids in one control period allocated to the set of network devices corresponding to the over-the-air area is inversely proportional to a minimum value of service delays included in the service request of the terminal device in the over-the-air area.

In other words, the more service requests of the terminal device located in one over-the-air area and/or the higher requirement for the service request delay, the more time grids in one control period allocated to the set of network devices corresponding to the over-the-air area.

For example, when the number of service requests or an amount of to-be-scheduled transmission data of the terminal device located in an over-the-air area is relatively large, the number of time grids within which the set of network devices that correspond to an altitude level provide the network service is increased. When a requirement for the service request delay of the terminal device located in an over-the-air area is relatively high, the number of time grids within which the set of network devices that correspond to the altitude level provide the network service is increased.

Optionally, step S12 includes, but not limited to, the following two specific implementations.

A first implementation includes the following steps.

Received power of a terminal device in any over-the-air area with respect to each network device is obtained. The received power includes received power of at least one of the following signals: a reference signal, a synchronization signal, and a channel state reference signal, the network device is added to a set of candidate network devices if the received power of the terminal device with respect to the network device is greater than a preset power threshold, and a set of network devices corresponding to each over-the-air area are determined from the set of candidate network devices.

A second implementation includes the following steps.

According to a space propagation loss model between each network device and a terminal device at any location and a distance between the network device and the terminal device, received power at any location within a coverage area of a network service provided by a network device is determined, where the received power includes received power of at least one of the following signals: a reference signal, a synchronization signal, and a channel state reference signal, the network device is added to a set of candidate network devices if the received power of the terminal device with respect to the network device is greater than a preset power threshold, and a set of network devices corresponding to each over-the-air area are determined from the set of candidate network devices.

The received power of the reference signal, the synchronization signal and the channel state reference signal reflects network coverage quality of a beam sequence with respect to the terminal device to some extent. In a possible implementation of an embodiment of the present disclosure, the following manner is used to determine the received power of the reference signal, the synchronization signal, and the channel state reference signal.

When the network device is initially started, all beam sequences are enabled. As a result, the terminal device in any over-the-air area performs channel measurement after detecting a signal of any beam sequence of any network device and feeds back measurement information to the network device, and the network device sends the measurement information to a network management system or a primary serving base station. Moreover, when the network device is initially started, identification information of all the beam sequences of the network device may be further sent to the network management system or the primary serving base station.

In another possible implementation of an embodiment of the present disclosure, the following manner is used to determine the received power of the reference signal, the synchronization signal, and the channel state reference signal.

Through network planning simulation software, each network devices may be controlled to send the reference signal, the synchronization signal, and the channel state reference signal, and the received power at any location within the coverage area of the network service provided by the network device is calculated by using the space propagation loss model between the network device and a terminal device at any location.

After the received power of the reference signal, the synchronization signal, and the channel state reference signal are determined, a received power threshold of one or more of the reference signal, the synchronization signal, and the channel state reference signal may be preset. When the received power of a terminal device with respect to a beam sequence obtained through measurement is greater than the corresponding received power threshold, a network device which the beam sequence belongs to is added to the set of candidate network devices, where the set of candidate network devices is empty upon initialization, that is, the set of candidate network devices excludes any network device.

Finally, the set of network devices corresponding to each over-the-air area is determined from the set of candidate network devices.

Whether the network device belongs to a set of network devices corresponding to any over-the-air area is determined according to the received power value, which is only an example for description. During actual implementation, the following two manners may be specifically used to determine, according to the measurement information, the set of network devices providing the network service for each over-the-air area in this embodiment of the present disclosure.

In a first manner: a set of network devices corresponding to each over-the-air area is determined from the set of candidate network devices based on a seamless coverage principle which means that a respective network device provides a network service at any location within each over-the-air area.

In a case that the network quality is ensured, any location in each over-the-air area is covered by a network to ensure that the terminal device can access the network at any location in each over-the-air area in the manner above.

In a second manner: a coverage area of the network service provided by each network device in the set of candidate network devices is determined, and a second network device is deleted from the set of candidate network devices to obtain a minimized set of network devices if a coverage area of a network service provided by a first network device in the set of candidate network devices covers a coverage area of a network service provided by the second network device, and a set of network devices corresponding to each over-the-air area is determined from the minimized set of network devices. Herein, the first network device and the second network device are any two different network devices in the set of candidate network devices.

The minimized set of network devices may be obtained in the manners above, thereby reducing an overhead of the network device, decreasing cell reselection and handover caused by network planning and terminal device movement, and reducing management complexity.

It should be noted that, in an embodiment of the present disclosure, the first manner and the second manner above may also be combined to determine the set of network devices corresponding to each over-the-air area. For example, when the received power of a terminal device with respect to a beam sequence is greater than the preset power threshold, a network device which the beam sequence belongs to is determined and a set of candidate network devices is obtained, a coverage area of the network service provided by each network device in the set of candidate network devices is determined based on the second manner, and a second network device is deleted from the set of candidate network devices to obtain the minimized set of network devices if a coverage area of the network service provided by a first network device in the set of candidate network devices covers a coverage area of the network service provided by the second network device. Further, a set of network devices corresponding to each over-the-air area is determined from the minimized set of network devices based on the seamless coverage principle. In other words, in a case that a seamless coverage is realized, the number of network devices providing the network service for the over-the-air area is minimized, and the overhead of the network device are reduced without affecting the network service.

Figure 3:
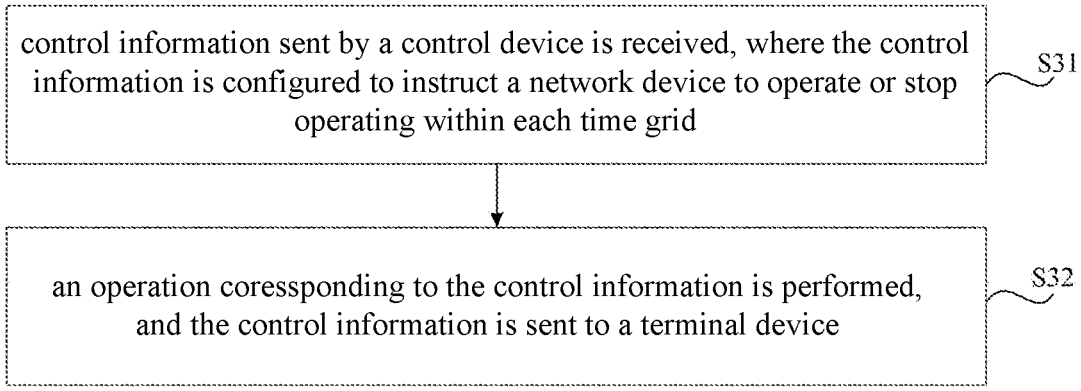
FIG. 3 is a flowchart of a method for sending control information according to an embodiment of the present disclosure.

Based on a same inventive concept, an embodiment of the present disclosure further provides a method for sending control information. The method is applied to a controlled device, that is, applied to a network device. The control device may be a network management system, and in this case, the controlled device (that is, the network device) is a base station. Or, the control device may be a primary serving base station, and in this case, the controlled device is a secondary serving base station. Referring to FIG. 3, FIG. 3 is a flowchart of a method for sending control information according to an embodiment of the present disclosure. As shown in FIG. 3, the method includes the following steps.

Step S31: control information sent by a control device is received, where the control information is configured to instruct a network device to operate or stop operating within each time grid;

Step S32: an operation corresponding to the control information is performed, and the control information is sent to a terminal device.

After the control device performs the method shown in FIG. 1, that is, after the control device sends the control information to each network device, each network device may perform the method shown in FIG. 3. After receiving the control information sent by the control device, each network device may determine, according to the control information, whether to operate at a current moment. One network device operates within some time grids to provide the network service for over-the-air areas corresponding to these time grids and further perform data transmission with a terminal device located in the over-the-air areas corresponding to these time grids. In addition, the network device stops operating within other time grids to avoid causing interference to other network devices.

FIG. 2 exemplifies that a time grid 1 corresponds to a set of network devices (that is, a set of network devices 1) corresponding to an over-the-air area 1, and that a time grid 3 corresponds to a set of network devices (that is, a set of network devices 3) corresponding to an over-the-air area 3. The network device 1 receives the following control information: operating within the time grid 1 and the time grid 3, and stopping operating within the time grid 2. The network device 1 operates to provide a network service for the over-the-air area 1 or the over-the-air area 3 and further performs data transmission with the terminal devices located in the over-the-air area 1 or the over-the-air area 3 if a current time is right within the time grid 1 or the time grid 3. The network device 1 operates to provide a network service for the over-the-air area 1 or the over-the-air area 3 and further performs data transmission with the terminal devices located in the over-the-air area 1 or the over-the-air area 3 if a current time is right within the time grid 1 or the time grid 3. The network device 1 stops operating to avoid causing interference to a network device 2, a network device 3 and a network device 4 if the current time is within the time grid 2.

Figure 4:
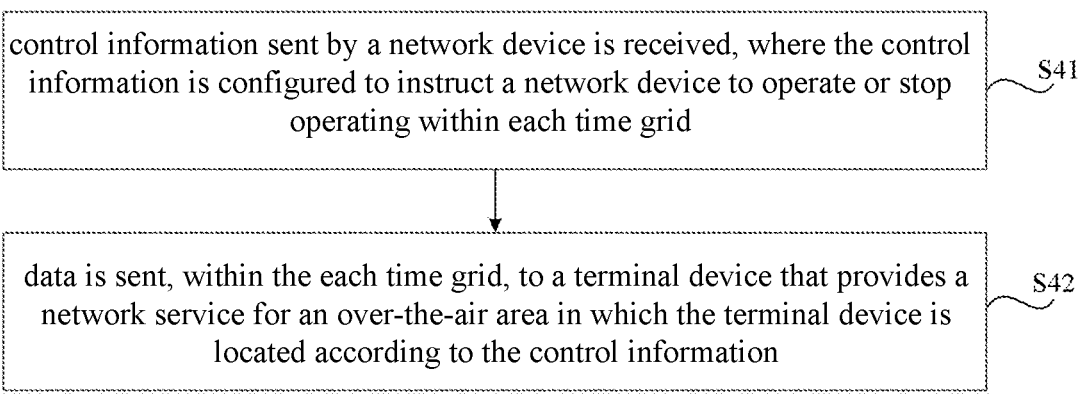
FIG. 4 is a flowchart of a method for sending data according to an embodiment of the present disclosure.

Based on the same inventive concept, an embodiment of the present disclosure further provides a method for sending data. The method is applied to a terminal device, for example, a terminal on the ground or a UAV flying in the air. Referring to FIG. 4, FIG. 4 is a flowchart of a method for sending data according to an embodiment of the present disclosure. As shown in FIG. 4, the method includes the following steps.

Step S41: control information sent by a network device is received, where the control information is configured to instruct a network device to operate or stop operating within each time grid;

Step S42: data is sent, within the each time grid, to a network device that provides a network service for an over-the-air area in which the terminal device is located according to the control information.

After the network device performs the method shown in FIG. 3, that is, after the network device sends the control information to the terminal device, the terminal device may perform the method shown in FIG. 4. After receiving the control information sent by the network device, the terminal device may determine, according to the control information, to which network device data is sent at which moment. Because the network device operates only within some time grids and is dedicated to only an over-the-air area within the some time grids, the terminal device first determines a corresponding over-the-air area according to an altitude at which the terminal device is located, then determines a set of network devices corresponding to the over-the-air area and a time grid corresponding to the set of network devices, and finally sends data to the network device of the determined set of network devices within a determined time grid. As a result, the terminal devices located in different over-the-air areas send data to respective corresponding network devices within different time grids.

FIG. 2 exemplifies that a time grid 1 corresponds to a set of network devices (that is, a set of network devices 1) corresponding to an over-the-air area 1, and that a time grid 3 corresponds to a set of network devices (that is, a set of network devices 3) corresponding to an over-the-air area 3.

A terminal device 1 determines a corresponding over-the-air area 1 a according to an altitude at which the terminal device 1 is located. Because the time grid 1 corresponds to the over-the-air area 1, and the set of network devices corresponding to the over-the-air area 1 is the set of network devices 1 which includes a network device 1, a network device 2, and a network device 3, therefore, the terminal device 1 may send data to one or more of the network device 1, the network device 2, and the network device 3 within the time grid 1. Because other time grids correspond to sets of network devices corresponding to other over-the-air areas, the terminal device 1 does not send data within other time grids, thereby avoiding causing interference to other terminal devices.

Figure 5:
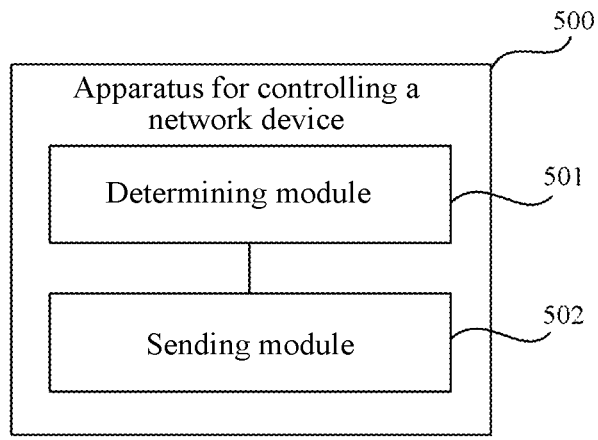
FIG. 5 is a schematic diagram of an apparatus for controlling a network device according to an embodiment of the present disclosure.

Based on the same inventive concept, an embodiment of the present disclosure further provides an apparatus 500 for controlling a network device, which is configured to perform steps of a method for controlling the network device provided in the method embodiment above. FIG. 5 is a schematic diagram of an apparatus for controlling the network device according to an embodiment of the present disclosure. As shown in FIG. 5, the apparatus 500 includes a determining module 501 and a sending module 502.

The determining module 501 is configured to determine a set of network devices that corresponds to each over-the-air area and that provides a network service for the over-the-air area.

The sending module 502 is configured to send control information to each network device, where the control information is configured to instruct, within each time grid, a network device in the set of network devices corresponding to the each time grid to operate and a network device not in the set of network devices corresponding to the each time grid to stop operating.

Optionally, the determining module includes an obtaining submodule, a first adding submodule and a first determining submodule.

The obtaining submodule is configured to obtain received power of a terminal device located in any over-the-air area with respect to each network device, where the received power includes received power of at least one of the following signals: a reference signal, a synchronization signal, and a channel state reference signal.

The first adding submodule is configured to add a network device to a set of candidate network devices if the received power of the terminal device with respect to the network device is greater than a preset power threshold.

The first determining submodule is configured to determine a set of network devices corresponding to each over-the-air area from the set of candidate network devices.

Optionally, the determining module includes a second determining submodule, a second adding submodule and a third determining submodule.

The second determining submodule is configured to determine, according to a space propagation loss model between each network device and a terminal device at any location and a distance between the network device and the terminal device, where received power at any location within a coverage area of the network service provided by the network device the received power includes received power of at least one of the following signals: the reference signal, the synchronization signal, and the channel state reference signal.

The second adding submodule is configured to add a network device to a set of candidate network devices if the received power of the terminal device with respect to the network device is greater than a preset power threshold.

The third determining submodule is configured to determine a set of network devices corresponding to each over-the-air area from the set of candidate network devices.

Optionally, the determining module includes a fourth determining submodule.

The fourth determining submodule is configured to determine a set of network devices corresponding to each over-the-air area from the set of candidate network devices based on a seamless coverage principle which means that a respective network device provides the network service at any location in each over-the-air area.

Optionally, the determining module includes a fifth determining submodule, a deleting submodule and a sixth determining submodule.

The fifth determining submodule is configured to determine a coverage area of the network service provided by each network device in the set of candidate network devices.

The deleting submodule is configured to delete a second network device from the set of candidate network devices if a coverage area of the network service provided by a first network device in the set of candidate network devices covers a coverage area of the network service provided by the second network device, to obtain a minimized set of network devices, where the first network device and the second network device are any two different network devices in the set of candidate network devices.

The sixth determining submodule is configured to determine the set of network devices corresponding to each over-the-air area from the minimized set of network devices.

Optionally, the sixth determining submodule is configured to: determine the set of network devices corresponding to each over-the-air area from the minimized set of network devices based on a seamless coverage principle which means that a respective network device provides the network service at any location in each over-the-air area.

Optionally, the apparatus further includes an allocating module.

The allocating module is configured to respectively allocate each time grid included in a control period to each over-the-air area according to the number of service requests and/or a service request delay of a terminal device located in each over-the-air area.

Figure 6:
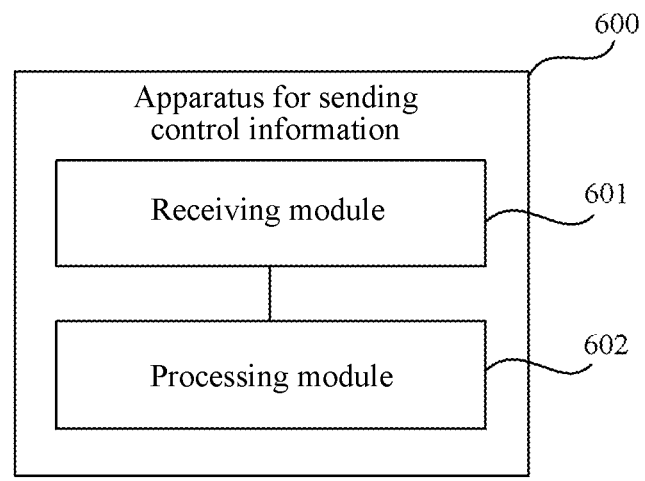
FIG. 6 is a schematic diagram of an apparatus for sending control information according to an embodiment of the present disclosure.

Based on the same inventive concept, an embodiment of the present disclosure further provides an apparatus 600 for sending control information, which is configured to perform steps of a method for sending the control information provided in the method embodiment above. FIG. 6 is a schematic diagram of an apparatus for sending control information according to an embodiment of the present disclosure. As shown in FIG. 6, the apparatus 600 including a receiving module 601 and a processing module 602.

The receiving module 601 is configured to receive control information sent by a control device. The control information is configured to instruct a network device to operate or stop operating within each time grid.

The processing module 602 is configured to perform an operation corresponding to the control information, and send the control information to a terminal device.

Figure 7:
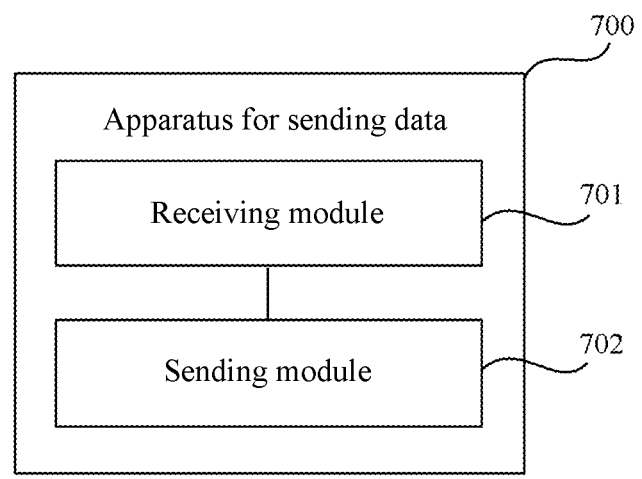
FIG. 7 is a schematic diagram of an apparatus for sending data according to an embodiment of the present disclosure.

Based on the same inventive concept, an embodiment of the present disclosure further provides an apparatus 700 for sending data which is configured to implement steps of a method for sending data provided in the method embodiment. FIG. 7 is a schematic diagram of an apparatus for sending data according to an embodiment of the present disclosure. As shown in FIG. 7, the apparatus 700 including a receiving module 701 and a sending module 702.

The receiving module 701 is configured to receive control information sent by a network device, where the control information is configured to instruct the network device to operate or stop operating within each time grid.

The sending module 702 is configured to send, within the each time grid, data to a network device that provides a network service for an over-the-air area in which the terminal device is located according to the control information.

For the apparatus in the embodiment above, a specific manner in which each of the modules perform the operation has been described in detail in the related method embodiment, and is not explained in detail herein.

Figure 8:
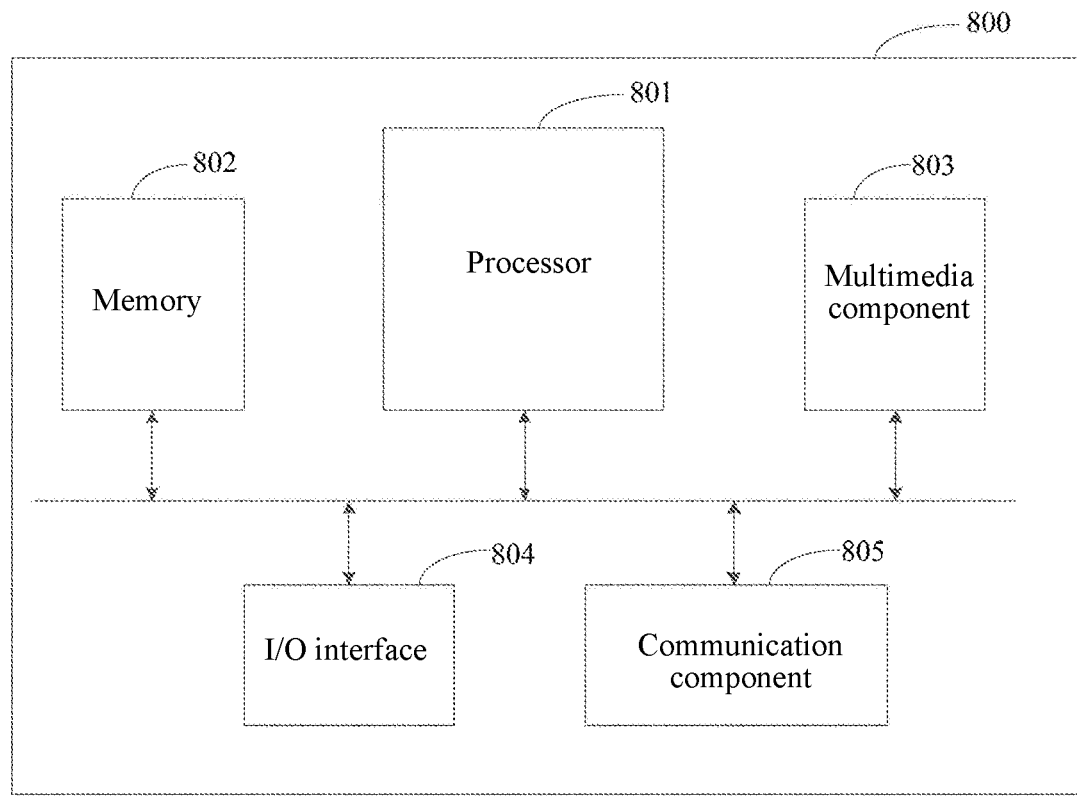
FIG. 8 is a block diagram of a terminal device according to an exemplary embodiment of the present disclosure.

FIG. 8 is a block diagram of a terminal device 800 according to an exemplary embodiment of the present disclosure. As shown in FIG. 8, the terminal device 800 may include a processor 801, a memory 802, a multimedia component 803, an input/output (I/O) interface 804, and a communication component 805.

The processor 801 is configured to control overall operation of the terminal device 800 to complete all or some steps in the method for sending data above. The memory 802 is configured to store various types of data to support operations on the terminal device 800. Such data may include, for example, an instruction used to perform any application program or method operated on the terminal device 800, and application-related data, such as contact data, a received/transmitted message, a picture, audio, and a video, and the like. The memory 802 may be implemented by any type of volatile or non-volatile storage device or a combination thereof, such as a static random access memory (SRAM for short), an electrically erasable programmable read-only memory (EEPROM for short), an erasable programmable read-only memory (EPROM for short), a programmable read-only memory (PROM for short), a read only memory (ROM for short), a magnetic memory, a flash memory, and a magnetic disk or an optical disk. The multimedia component 803 may include a screen and an audio component. The screen may be, for example, a touch screen, and the audio component is configured to output and/or input an audio signal. For example, the audio component may include a microphone which is configured to receive an external audio signal. The received audio signal may be further stored in the memory 802 or sent via the communication component 805. The audio component further includes at least one speaker which is configured to output the audio signal. The I/O interface 804 provides an interface between the processor 801 and other interface modules. The other interface modules above may be a keyboard, a mouse, and a button, and the like. These buttons may be virtual buttons or physical buttons. The communication component 805 is configured to perform wired or wireless communication between the terminal device 800 and other devices. Wireless communication includes, for example, Wi-Fi communication, Bluetooth communication, near field communication (NFC for short), 2G communication, 3G communication, or 4G communication, or one or a combination thereof. Therefore, the respective communication component 805 may include a Wi-Fi module, a Bluetooth module, and an NFC module.

In an exemplary embodiment, the terminal device 800 may be implemented by one or more application specific integrated circuits (ASIC for short), a digital signal processor (DSP for short), a digital signal processing device (DSPD for short), a programmable logic device (PLD for short), a field programmable gate array (FPGA for short), a controller, a microcontroller, a microprocessor, or other electronic elements, which is configured to perform the method for sending data above.

In another exemplary embodiment, a computer readable storage medium including a program instruction is further provided, such as the memory 802 including the program instruction. The program instruction above may be executed by the processor 801 of the terminal device 800 to perform the method for sending data above.

Figure 9:
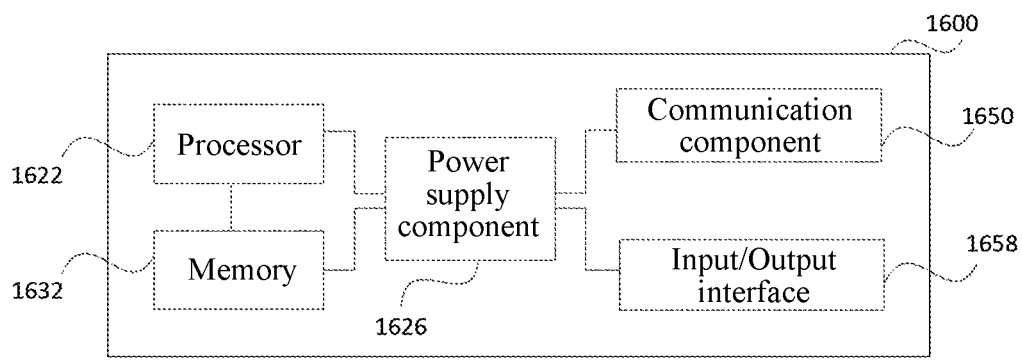
FIG. 9 is a block diagram of an electronic device according to an exemplary embodiment of the present disclosure.

FIG. 9 is a block diagram of an electronic device 1600 according to an exemplary embodiment of the present disclosure. For example, the electronic device 1600 may be provided as a control device or a network device. Referring to FIG. 9, the electronic device 1600 includes one or more processors 1622 and a memory 1632 which is configured to store a computer program executable by the processor 1622. The computer program stored in the memory 1632 may include one or more modules and each module corresponds to a set of instructions. Moreover, the processors 1622 may be configured to execute the computer program to perform the method for controlling the network device or the method for sending the control information above.

In addition, the electronic device 1600 may further include a power supply component 1626 and a communication component 1650. The power supply component 1626 may be configured to perform power management for the electronic device 1600, and the communication component 1650 may be configured to implement communication for the electronic device 1600, such as, wired or wireless communication. Furthermore, the electronic device 1600 may further include an input/output (I/O) interface 1658. The electronic device 1600 may operate an operating system stored in the memory 1632, such as Windows Server™, Mac OS X™, Unix™, and Linux™, and the like.

In another exemplary embodiment, a computer readable storage medium including a program instruction is further provided, such as the memory 1632 including the program instruction. The program instruction above may be executed by the processor 1622 of the electronic device 1600 to perform the method for controlling the network device or the method for sending control information above.

Preferred embodiments of the present disclosure above are described in detail with reference to the accompanying drawings. However, the present disclosure is not limited to specific details of the embodiments above. A plurality of simple variations may be made to the technical solutions of the present disclosure within the scope of the technical idea of the present disclosure. These simple variations fall within the protection scope of the present disclosure.

It should be further noted that each specific technical feature described in the specific embodiments above may be combined in any suitable manner without contradictions. In order to avoid unnecessary repetitions, various possible combination manners are not described again in the present disclosure.

In addition, the various embodiments of the present disclosure may be combined arbitrarily without deviating from the idea of the present disclosure, and the combined embodiments should be considered as the content disclosed in the present disclosure.

What is claimed is:

1. A method for controlling network devices, applied to a control device, comprising:
   with respect to each over-the-air area of a plurality of over-the-air areas, determining a set of network devices that corresponds to the over-the-air area and that provides network service for the over-the-air area, wherein, the over-the-air area corresponds to an altitude level region or an altitude value range; and
   sending control information to the network devices, wherein the control information is configured to instruct, for each time grid of a plurality of time grids, each network device in a set of network devices corresponding to the time grid to operate, and each network device in any other set of network devices not corresponding to the time grid to stop operating;
   wherein determining a set of network devices that corresponds to the over-the-air area and that provides network service for the over-the-air area comprises:

determining first received power or second received power for each respective network device of the network devices, the first received power being received power of a terminal device located in the over-the-air area with respect to the respective network device, the second received power being received power at any location within a coverage area of network service provided by the respective network device and being determined according to a space propagation loss model between the respective network device and a terminal device at any location in the-over-the-air area and a distance between the respective network device and the terminal device, wherein the first received power or the second received power includes received power of at least one of the following signals: a reference signal, a synchronization signal, and a channel state reference signal;

determining a set of candidate network devices, wherein the first received power or the second received power for each of the set of candidate network devices is greater than a preset power threshold;

determining a coverage area of network service provided by each network device in the set of candidate network devices;

deleting a second network device from the set of candidate network devices to obtain a reduced set of network devices if a coverage area of a network service provided by a first network device in the set of candidate network devices includes a coverage area of a network service provided by the second network device, wherein the first network device and the second network device are two different network devices in the set of candidate network devices; and determining the set of network devices corresponding to the over-the-air area from the reduced set of network devices.

2. The method according to claim 1, wherein determining the set of network devices that corresponds to the over-the-air area and that provides network service for the over-the-air area comprises:

determining the set of network devices corresponding to the over-the-air area from the set of candidate network devices based on a seamless coverage principle which means that a respective network device provides the network service at any location within the over-the-air area.

3. The method according to claim 1, wherein determining the set of network devices corresponding to the over-the-air area from the reduced set of network devices comprises:

determining the set of network devices corresponding to the over-the-air area from the reduced set of network devices based on a seamless coverage principle which means that a respective network device provides the network service at any location in the over-the-air area.

4. The method according to claim 1, wherein the method further comprises:

allocating, according to the number of service requests and/or a service request delay of a terminal device located in the over-the-air area, each time grid in a control period to the over-the-air area respectively.

5. The method according to claim 4, wherein
the number of time grids in one control period allocated to the set of network devices corresponding to the over-the-air area is directly proportional to the number of service requests of the terminal device in the over-the-air area; or
the number of time grids in one control period allocated to the set of network devices corresponding to the over-the-air area is inversely proportional to a minimum value of service delays in the service request of the terminal device in the over-the-air area.

6. A non-transitory computer readable storage medium, wherein the non-transitory computer readable storage medium comprises one or more programs which, when executed by a processor, cause the processor to perform the method according to claim 1.

7. An apparatus for controlling a network device, comprising: the non-transitory computer readable storage medium according to claim 6; and
one or more processors, configured to execute a program in the non-transitory computer readable storage medium.

8. A control device, comprising the apparatus for controlling a network device according to claim 7, wherein the control device is a network management system device or a primary serving base station.

9. A method for sending control information applied to a first network device among a plurality of network devices, comprising:

receiving control information sent by a control device, wherein the control information is configured to instruct the first network device to operate or stop operating within a time grid, and the control information is configured to instruct, for the time grid, each network device in a set of network devices corresponding to the time grid to operate, and each network device in any other set of network devices not corresponding to the time grid to stop operating, wherein, each set of network devices provides network service for an over-the-air area corresponding to an altitude level region or an altitude value range; and performing an operation corresponding to the control information, and sending the control information to a terminal device located in an over-the-air area corresponding to a set of network devices including the first network device;

wherein, the set of network devices including the first network device is determined for the corresponding the over-the-air area by performing steps of:

determining first received power or second received power for each respective network device of the plurality of network devices, the first received power being received power of a terminal device located in the corresponding over-the-air area with respect to the respective network device, the second received power being received power at any location within a coverage area of network service provided by the respective network device and being determined according to a space propagation loss model between the respective network device and a terminal device at any location in the corresponding over-the-air area and a distance between the respective network device and the terminal device, wherein the first received power or the second received power includes received power of at least one of the following signals: a reference signal, a synchronization signal, and a channel state reference signal;

determining a set of candidate network devices, wherein the first received power or the second received power for each of the set of candidate network devices is greater than a preset power threshold;

determining a coverage area of network service provided by each network device in the set of candidate network devices;

deleting a second network device from the set of candidate network devices to obtain a reduced set of network devices if a coverage area of a network service provided by a first network device in the set of candidate network devices includes a coverage area of a network service provided by the second network device, wherein the first network device and the second network device are two different network devices in the set of candidate network devices; and determining the set of network devices corresponding to the over-the-air area from the reduced set of network devices.

10. A method for sending data applied to a terminal device, comprising:

receiving control information sent by a network device, wherein the control information is configured to instruct the network device to operate or stop operating within each time grid, and the control information is configured to instruct, for each time grid, each network device in a set of network devices corresponding to the time grid to operate, and each network device in another set of network devices not corresponding to the time grid to stop operating, wherein, each of the set of network devices and the another set of networks comprises a plurality of network devices that provides network service for an over-the-air area, and the over-the-air area is corresponds to an altitude level region or an altitude value range;

determining an over the air area in which the terminal device is located; and sending, within a time grid corresponding to the over the air area, data to one or more network devices that provide network services for the over-the-air area in which the terminal device is located according to the control information;

wherein, each set of network devices is determined for a corresponding over-the-air area by performing steps of:

determining first received power or second received power for each respective network device of a plurality of network devices, the first received power being received power of a terminal device located in the corresponding over-the-air area with respect to the respective network device, the second received power being received power at any location within a coverage area of network service provided by the respective network device and being determined according to a space propagation loss model between the respective network device and a terminal device at any location in the corresponding over-the-air area and a distance between the respective network device and the terminal device, wherein the first received power or the second received power includes received power of at least one of the following signals: a reference signal, a synchronization signal, and a channel state reference signal;

determining a set of candidate network devices, wherein the first received power or the second received power for each of the set of candidate network devices is greater than a preset power threshold; and determining a coverage area of network service provided by each network device in the set of candidate network devices;

deleting a second network device from the set of candidate network devices to obtain a reduced set of network devices if a coverage area of a network service provided by a first network device in the set of candidate network devices includes a coverage area of a network service provided by the second network device, wherein the first network device and the second network device are two different network devices in the set of candidate network devices; and determining the set of network devices corresponding to the over-the-air area from the reduced set of network devices.

\* \* \* \* \*